US011384806B2

(12) United States Patent
Rodriguez et al.

(10) Patent No.: US 11,384,806 B2
(45) Date of Patent: Jul. 12, 2022

(54) BRAKING BAND OF A DISC BRAKE DISC

(71) Applicant: FRENI BREMBO S.P.A., Curno (IT)

(72) Inventors: Facundo Hèctor Rodriguez, Curno (IT); Massimiliano Maroni, Curno (IT); Giuseppe Carletti, Curno (IT)

(73) Assignee: Freni Brembo S.p.A., Bergamo (IT)

(*) Notice: Subject to any disclaimer, the term of this patent is extended or adjusted under 35 U.S.C. 154(b) by 56 days.

(21) Appl. No.: 16/758,901

(22) PCT Filed: Oct. 18, 2018

(86) PCT No.: PCT/IB2018/058087
§ 371 (c)(1),
(2) Date: Apr. 24, 2020

(87) PCT Pub. No.: WO2019/082028
PCT Pub. Date: May 2, 2019

(65) Prior Publication Data
US 2021/0180659 A1 Jun. 17, 2021

(30) Foreign Application Priority Data
Oct. 24, 2017 (IT) .................... 102017000120728

(51) Int. Cl.
*F16D 65/12* (2006.01)
*F16D 65/847* (2006.01)
(Continued)

(52) U.S. Cl.
CPC .......... *F16D 65/128* (2013.01); *F16D 65/123* (2013.01); *F16D 65/847* (2013.01);
(Continued)

(58) Field of Classification Search
CPC ........................................... F16D 65/125–128
(Continued)

(56) References Cited
U.S. PATENT DOCUMENTS
2,345,016 A   3/1944  Tack
2,345,017 A * 3/1944  Tack ................... F16D 65/128
                                                     188/264 A
(Continued)

FOREIGN PATENT DOCUMENTS
EP    2459896 B1    8/2013
EP    2647864 B1    12/2015

OTHER PUBLICATIONS
European Patent Office, International Search Report with Written Opinion, Jan. 17, 2019, 12 pages, European Patent Office, Rijswijk, Netherlands.

*Primary Examiner* — Christopher P Schwartz
(74) *Attorney, Agent, or Firm* — Marshall & Melhorn, LLC

(57) ABSTRACT

A braking band of a disc for disc brake has a first plate and a second plate, a group of connecting fins connecting the first plate and the second plate, defining a module (M) repeated according to a circumferential direction (C-C). The first fin extends along a first longitudinal direction between a radially inner edge and a radially outer edge forming a circumferentially arched first stretch of first fin having a first concavity (R13) kept in the same sense along the entire extension of the first stretch of first fin in the first longitudinal direction, a circumferentially arched second stretch of first fin having a second concavity (R14), a circumferentially arched third stretch of first fin, and a circumferentially arched fourth stretch of first fin. The second fin develops along a second longitudinal direction between the radially inner edge and the radially outer edge. The first fin is shorter than the second fin.

15 Claims, 7 Drawing Sheets

(51) Int. Cl.
*F16D 65/02* (2006.01)
*F16D 65/78* (2006.01)

(52) U.S. Cl.
CPC ............... *F16D 2065/1316* (2013.01); *F16D 2065/1328* (2013.01); *F16D 2065/788* (2013.01)

(58) Field of Classification Search
USPC .............. 188/218 XL, 264 A, 264 AA, 18 A
See application file for complete search history.

(56) References Cited

U.S. PATENT DOCUMENTS

| | | | | |
|---|---|---|---|---|
| 2,380,085 | A * | 7/1945 | Tack | F16D 65/128 |
| | | | | 188/218 XL |
| 6,505,723 | B1 | 1/2003 | Annear | |
| 8,511,443 | B2 | 8/2013 | Veneziano et al. | |
| 9,206,868 | B2 * | 12/2015 | Veneziano | F16D 65/128 |
| 2009/0057077 | A1 * | 3/2009 | Mears | F16D 65/128 |
| | | | | 188/218 XL |

\* cited by examiner

|  | w/m²K | MF[g/s] | HT[w] |
|---|---|---|---|
| EP2647864B1 (PRIOR ART) | 163 | 322 | 22300 |
| INVENTION | 176 | 402 | 26740 |
| Δ%η | +8% | +25% | +20% |

BRAKING BAND OF A DISC BRAKE DISC

FIELD OF THE INVENTION

The present invention relates to a braking band for a disc brake disc.

In particular, the present invention relates to a braking band of the ventilated type.

The present invention further relates to a disc of disc brake and to a disc brake.

BACKGROUND ART

In a disc brake, the brake caliper is generally arranged straddling the outer peripheral margin of a brake disc, adapted to rotate about a rotation axis defining an axial direction. In a disc brake, a radial direction (R-R), arranged substantially orthogonal to said axial direction (X-X), and a tangential or circumferential direction (C-C), orthogonal to both said axial direction (X-X) and said radial direction (R-R), is further defined. Known brake discs oppose two opposite braking surfaces facing the friction material of the opposite brake pads provided on the caliper body placed straddling the disc.

The brake pads, appropriately actuated, by closing against the opposite braking surfaces of the disc, apply a considerable friction adapted to create the desired braking torque which concurrently transforms the motion energy of the vehicle into heat, which accumulates in the body of the braking band of the disc brake and in the brake pads themselves. Indeed, this heat extends from the braking surfaces of the disc to the braking band and to the entire body of the brake disc, whereby heating, and sometimes overheating, the body of the caliper which is straddling the disc. In particular, in applications on high-performance vehicles and/or vehicles with high braking efficiency, the energies to be disposed of are extremely large.

Brake discs of ventilated type are generally known, i.e. discs comprising a braking band having two opposite and mutually facing plates on which opposite braking surfaces are made, adapted to cooperate with opposing brake pads of a brake caliper placed straddling the disc to apply the braking action.

As known, the discs of the type specified above consist of two coaxial parts or plates. A first part or plate is adapted to be connected to a supporting bell, which is intended to be connected in turn to a wheel hub of a vehicle. The remaining peripheral part of the disc, which comprises the two plates and is commonly referred to as a braking band, is intended to cooperate with calipers for disc brake adapted to apply a braking action on the vehicle, thus applying, by means of pads, friction on opposite surfaces of the two plates, named braking surfaces.

Usually, said two plates are distanced in axial direction whereby delimiting a hollow space and provide a plurality of axial connecting elements, such as fins or pins, which structurally connect said two plates to each other, thus forming a gap together with the two plates. Known ventilated disc solutions have recently and continuously evolved, in particular as regards the number and conformation of the so-called ventilation channels within said gap. Such ventilation channels are defined in turn inside by the presence of such connecting elements.

A need is strongly felt to cool the rotating disc brake quickly and effectively.

In particular, in order to maximize the heat extracted from the disc, it is important for the air current to flow inside the gap in turbulent conditions, while ensuring load losses which are as small as possible to maximize the flow rate of the overheated cooling flow, exiting from the radially outer edge of the braking band of the rotating disc brake.

It is known that excessively high brake disc temperatures decrease braking action efficiency and may cause the deformation of the braking band, the formation of cracks on braking surfaces and transformations of localized status of the material forming the braking band, which in turn causes its premature deterioration.

Such a need to increase the cooling efficiency must in all cases be mediated with the further need to keep the overall dimensions unchanged, particularly in the axial direction of the discs to avoid modifications of the vehicle suspension for which they are intended. The contrasting need to lighten the brake discs is also felt, because being unsprung masses, their weight is directly proportional to the inertia of the rotating disc during braking.

The geometry of the ventilation channels defined by the arrangement and shape of the connecting fins is of primary importance for the cooling performance of the braking band of the disc brake.

In a typical arrangement of the connecting fins between the plates of the braking band, they constitute modular units which are repeated mutually side-by-side in order to make cooling features as uniform as possible on the entire body of the disc.

For example, documents EP-2459896 and EP-2647864 to the same Applicant show modular units consisting of a radially inner range and a radially outer range of fins having tapered shape. The fins of the radially outer range, being circumferentially offset with respect to the fins of the radially inner range, define variable section ventilation channels and oppose axial baffles facing the centrifugal flow of the cooling current.

Such an arrangement of the fins implies that during rotation of the disc about its axis, the cooling air due to centrifugal motion impacts against the walls of the fins of the radially outer range, i.e. the fins which form said axial baffles, and is conveyed around them. The cooling air flow passing through narrow passages and bottlenecks, as well the enlargements, consisting of the connecting tabs, locally and alternatively accelerates and slows the flow rate escaping from the radially outer edge of the braking band, thereby promoting local turbulence and thus the cooling of the brake disc body.

Although advantageous from many points of view, these known solutions are not free from drawbacks. In particular, the load losses caused by the arrangement of the fins necessarily limit the flow rate, the cooling air flow speed and the heat transfer from the disc body to the cooling fluid itself.

The need is strongly felt to provide a braking band and disc brake solution, capable of ensuring improved cooling efficiency with the same dimension as known solutions.

The need is strongly felt to provide a braking band and disc brake solution, capable of providing increased cooling fluid flow rate, the disc rotation being the same.

The need is a strongly felt to provide a braking band and disc brake solution, capable of maximizing the heat exchange between the brake disc body and the cooling fluid current, without because of this having overall dimensions and weights incompatible with applications on high-performance vehicles.

Solution

It is an object of the present invention to solve the drawbacks of the prior art and to provide a solution to the needs described hereto with reference to the prior art.

It is an object of the present invention to suggest a solution of braking band for brake disc capable of maximizing cooling efficiency.

It is an object of the present invention to provide a solution of ventilated braking band of brake disc adapted to maximize the cooling fluid flow rate exiting from the disc and minimizing load losses despite ensuring turbulent flow conditions.

These and other objects are achieved by the braking band, the brake disc and the disc brake described in detail below.

Some advantageous embodiments are also described.

DRAWINGS

Further features and advantages of the braking band and brake disc will become apparent from the following description of preferred embodiments thereof, given by way of non-limiting examples, with reference to the accompanying drawings, in which.

DESCRIPTION OF SOME PREFERRED EMBODIMENTS

Figure 1:
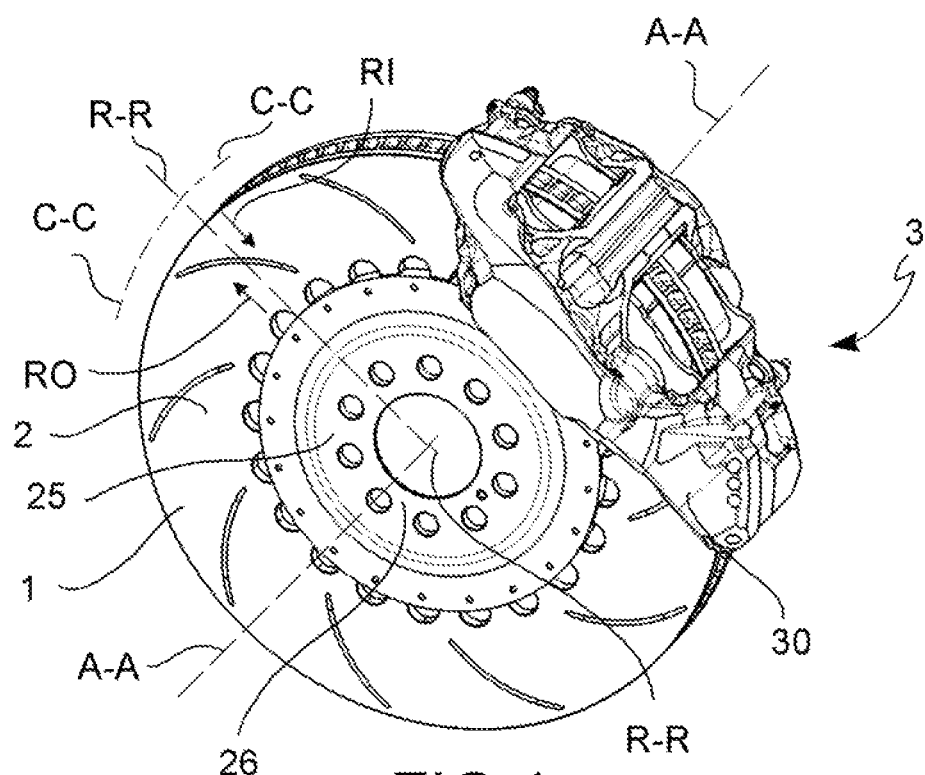
FIG. 1 is an axonometric view of a disc brake according to an embodiment, comprising a disc and a brake caliper.
Figure 2:
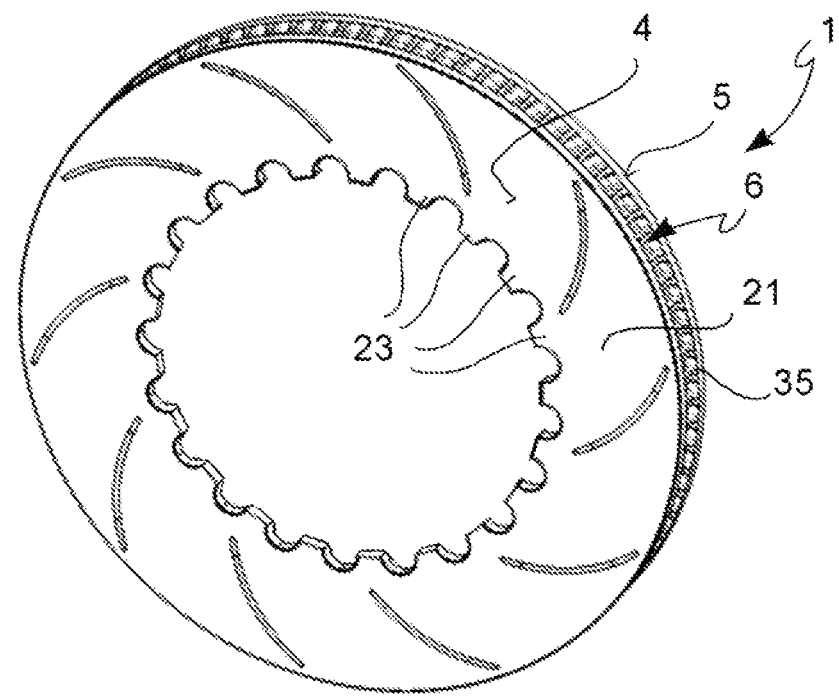
FIG. 2 is an axonometric view of a portion of a braking band, according to an embodiment.
Figure 3:
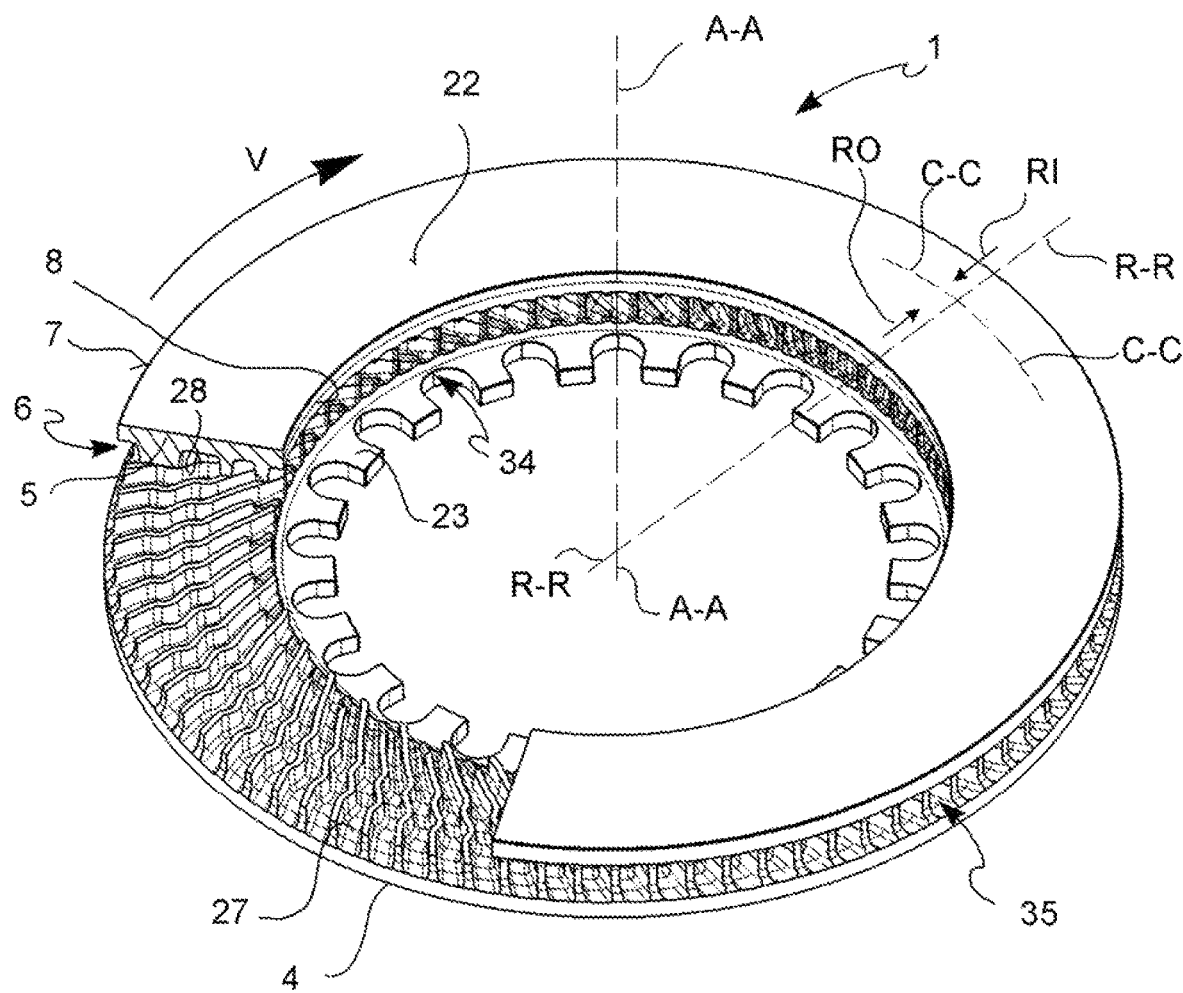
FIG. 3 is an axonometric view with parts partially sectioned for clarity showing a braking band, according to an embodiment.
Figure 4:
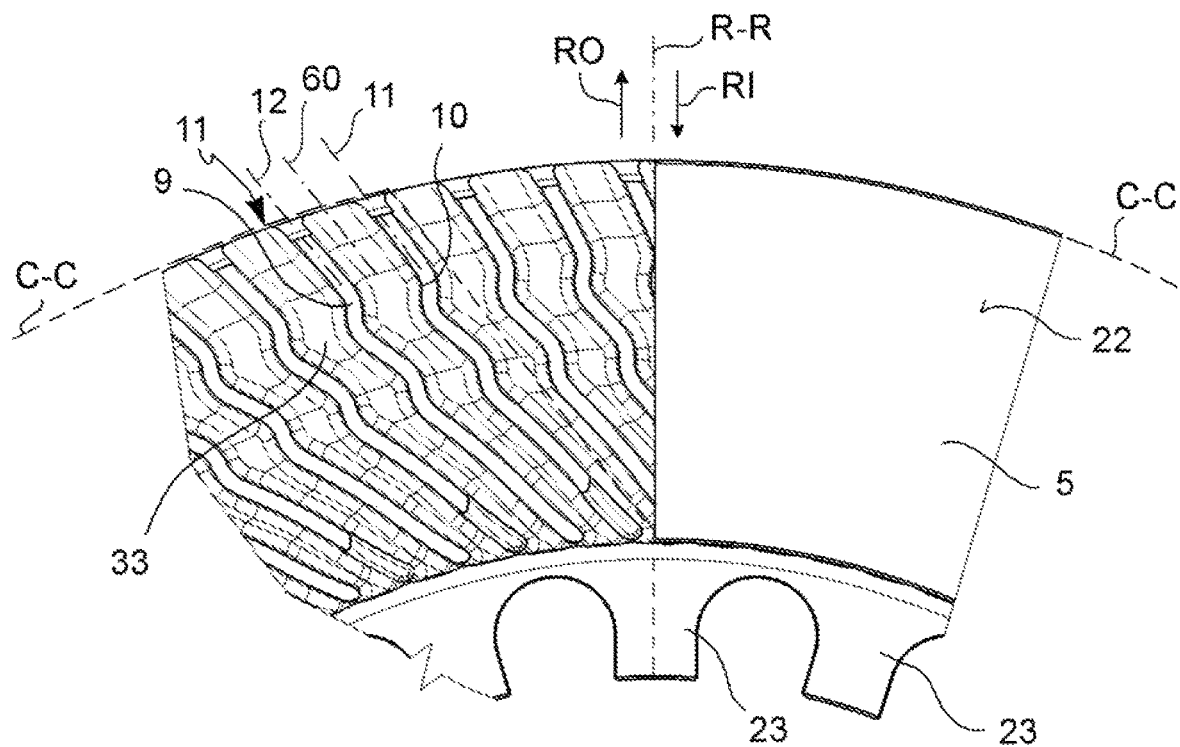
FIG. 4 is a plan view of a portion of the braking band shown in FIG. 3.
Figure 5:
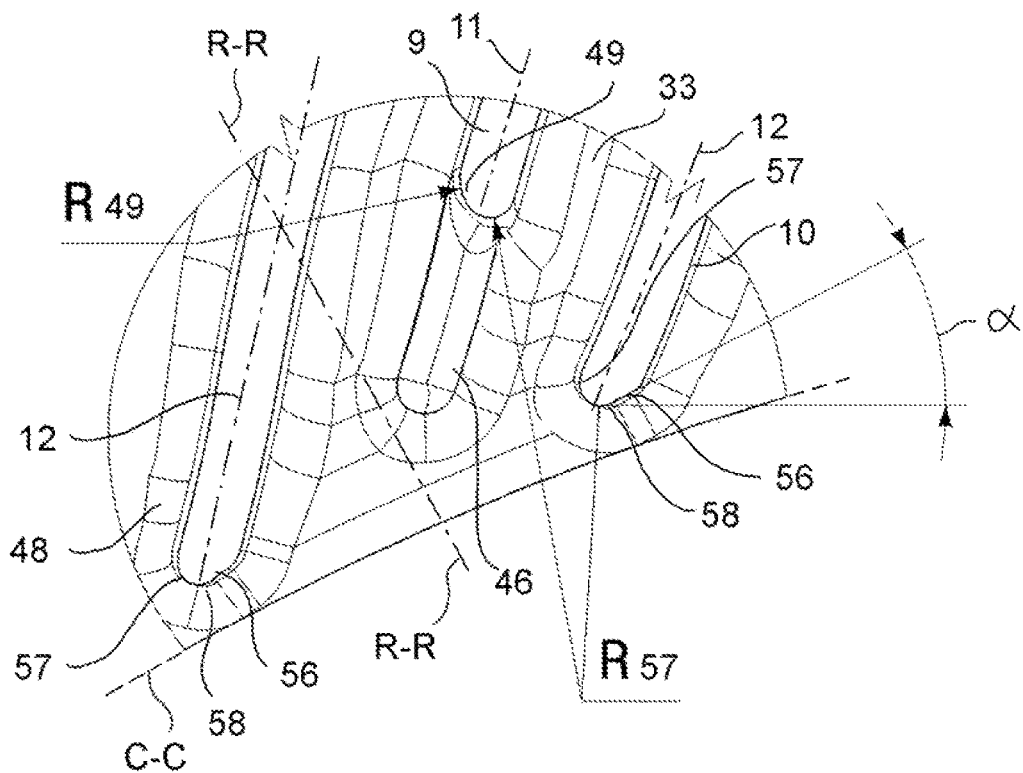
FIG. 5 is a view of a detail of the braking band according to an embodiment, when sectioned axially.
Figure 6:
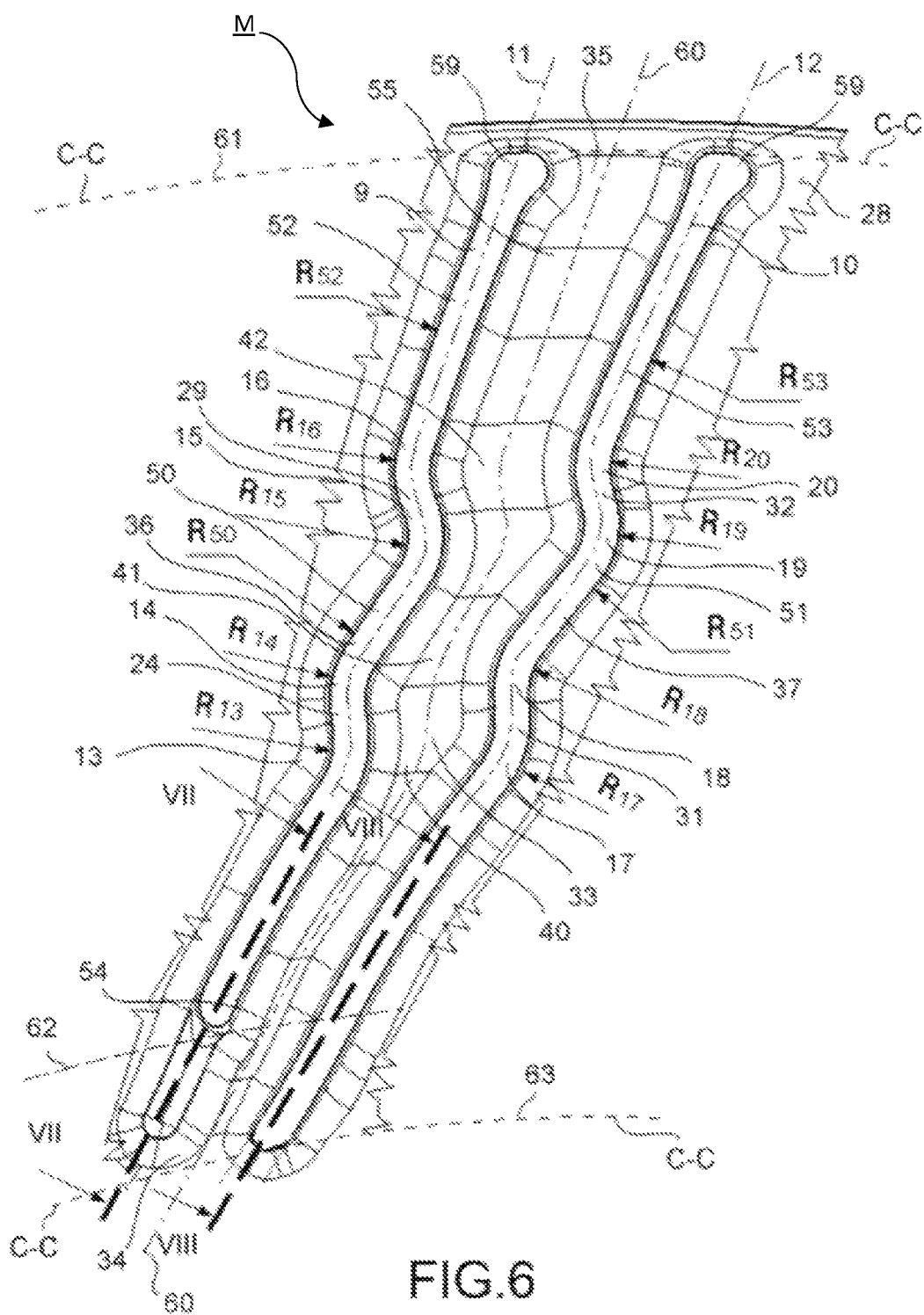
FIG. 6 is a plan view of a module consisting of a group of connecting fins and of the ventilation channel, according to an embodiment of the invention.
Figure 7:
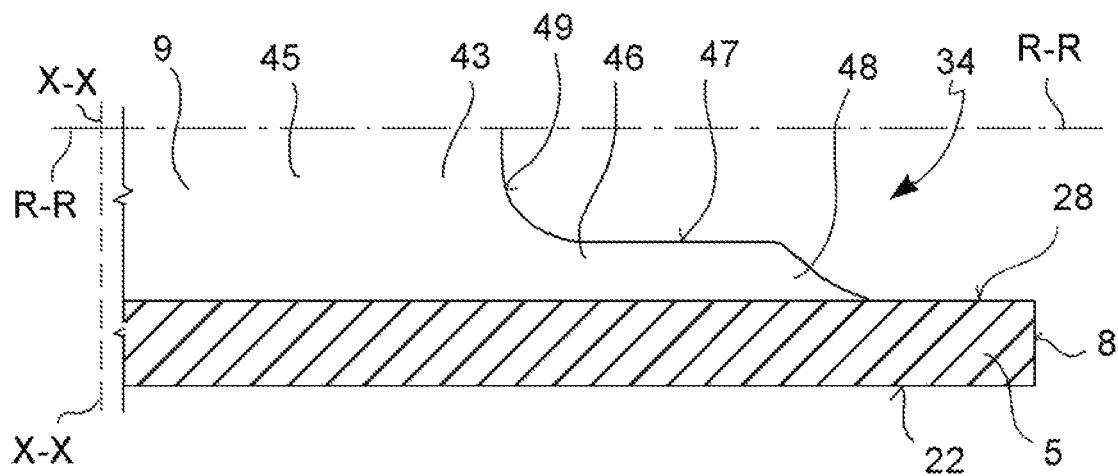
FIG. 7 is a section view of a first fin taken along the plotting plane shown by arrows VII-VII in FIG. 6.
Figure 8:
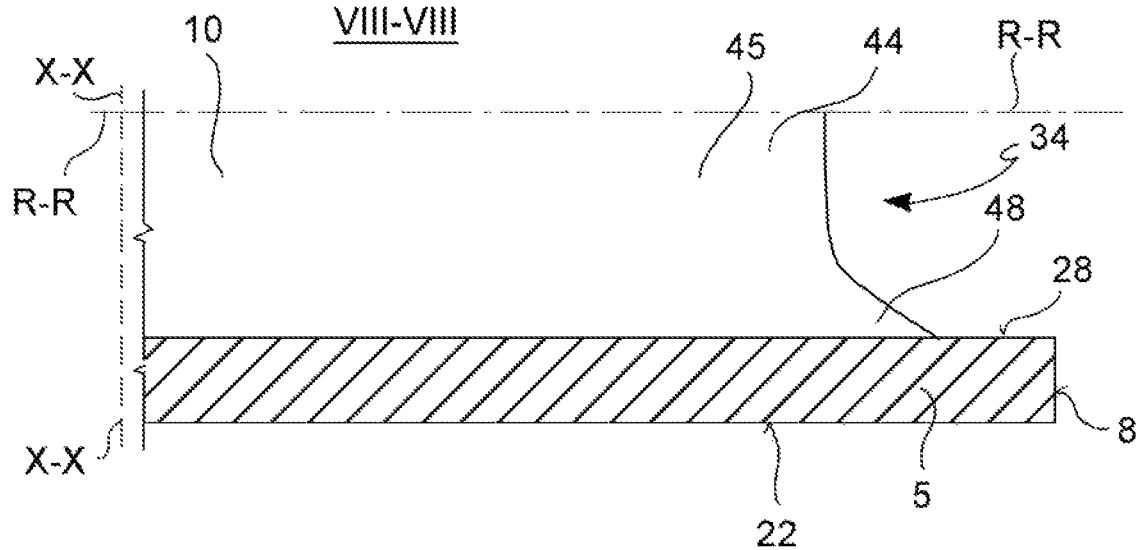
FIG. 8 is a section view of a second fin taken along the plotting line shown by the arrows VIII-VIII in FIG. 6.

According to a general embodiment, a braking band 1 of a disc 2 for a disc brake 3 is provided.

Said disc 2 defines a rotation axis A-A, which defines an axial direction X-X, either coinciding with or parallel to said axis rotation A-A of the disc 2, a radial direction R-R, substantially orthogonal to the axial direction X-X, and a circumferential C-C or tangential C-C direction, substantially orthogonal to the axial direction X-X and to the radial direction R-R. Said disc 2 further defines a radially inner direction RI, either parallel to or coinciding with the radial direction R-R and directed in approach towards the rotation axis A-A of the disc 2, and a radially outer direction RO, opposite to said radially inner direction RI. A plurality of concentric circumferences, either parallel to or coincident with the circumferential direction C-C and passing through predefined radial coordinates all having center on the rotation axis A-A of the disc 2, are also defined in said braking band 1.

Said braking band 1 comprises a first plate 4 and a second plate 5, arranged mutually facing each other so as to form a gap 6. In this manner, the braking band 1 is a ventilated braking band.

According to a preferred embodiment, said first plate 4 comprises a first braking surface 21 oppositely facing said gap and adapted to face at least a first brake pad provided in a brake caliper 30 associable with said disc 2, and said second plate 5 comprises a second braking surface 22, opposite to said first braking surface 21 and adapted to face at least a second brake pad opposite to said first brake pad and provided in said brake caliper 30 associable with the disc 2. According to a preferred embodiment, said first plate 4 comprises at least a first plate inner surface 27, or first inner surface 27, facing said second plate 5 and which delimits at least a portion of said cavity 6. According to a preferred embodiment, said second plate 5 comprises at least a second plate inner surface 28, or second inner surface 28, facing said first plate 4 and which delimits at least a portion of said cavity 6.

According to a preferred embodiment, at least either said first plate 4 or said second plate 5, preferably said second plate 4, comprises a radially inner edge 8, facing said rotation axis A-A of the disc 2, and a radially outer edge 7 substantially coaxial with said radially inner edge 8 and facing opposite with respect to said rotation axis A-A of the disc 2. Preferably, said radially inner edge 8 defines a radially inner first circumference and said radially outer edge 7 defines a radially inner second circumference coaxial to said first circumference.

Said braking band comprises a group of connecting-spacing fins 9, 10, or group of connecting fins 9, 10, which connects said first plate 4 and said second plate 5, defining a module M which is repeated according to said circumferential direction C-C remaining coaxial with the braking band 1.

According to an embodiment, said module M is in form of a segment of the braking band. Preferably, said module M is uniformly repeated, distributing itself in the gap 6 of the braking band 1. For example, one module and the next are mutually adjacent, thus avoiding the interposition of a further portion of braking band between said module and said next module.

According to an embodiment, a predetermined angle defining the pitch of the modules or pitch of group of connecting tabs 9, 10 is provided between one module and the next. By providing said pitch of the modules, each of said segments formed by each module M avoids having a vertex on the rotation axis A-A of the disc.

Said group of connecting fins 9, 10 comprises a first fin 9 which connects said first plate 4 and said second plate 5, and a second fin 10 which connects said first plate 4 and said second plate 5. Preferably, either said first fin 9 or said second fin 10 has a shorter length than the other.

Said first fin 9 extends along a first longitudinal direction 11 between said radially inner edge 8 and said radially outer edge 7. In other words, said first fin 9 extends along a first longitudinal direction 11 substantially coinciding with the longitudinal extension axis of said first fin 9 between said radially inner edge and said radially outer edge not necessarily for the entire plate portion between said radially inner edge and said radially outer edge.

Said first fin 9 extends according to said first longitudinal direction 11 forming a circumferentially arched first fin 13. The expression "circumferentially arched" indicates a stretch of fin which has a curvature in circumferential direction C-C in which the sense of the concavity does not change.

Said second fin 10 extends according to a second longitudinal direction 12 between said radially inner edge 8 and said radially outer edge 7, whereby forming a circumferentially arched second fin first stretch 17.

Preferably, the length of said first fin 9 is smaller than said second fin 10. In other words, the extension of said first fin along said first longitudinal direction 11 is smaller than the extension of said second fin in said second longitudinal extension 12.

Said first fin first stretch 13 has a first concavity R13 which is kept in the same sense along the entire extension of the first fin first stretch 13 in said first longitudinal direction 11.

Said first fin 9 extends according to said first longitudinal direction 11 further forming a circumferentially arched first fin second stretch 14.

Said first fin second stretch 14 has a second concavity R14 which is kept in the same sense along the entire extension of the first fin second stretch 14 in said first longitudinal direction 11.

Advantageously, said second concavity R14 has opposite sense with respect to said first concavity R13. In this manner, said first fin first stretch 13 and said first fin second stretch 14 describe an "S"-shaped profile on a plane parallel to the braking surfaces 21, 22 of the disc 2 and which crosses said gap 6. According to an embodiment, said first fin 9 comprises a first fin first inflection stretch 24 which is interposed between said first fin first stretch 13 and said first fin second stretch 14.

Said first fin 9 extends according to said first longitudinal direction 11 further forming a circumferentially arched first fin third stretch 15.

Said first fin third stretch 15 has a third concavity R15 which is kept in the same sense along the entire extension of the first fin third stretch 15 in said first longitudinal direction 11.

Said first fin 9 extends according to said first longitudinal direction 11 further forming a circumferentially arched first fin fourth stretch 16.

Said first fin fourth stretch 16 has a fourth concavity R16 which is kept in the same sense along the entire extension of the first fin third stretch 16 in said first longitudinal direction 11.

Further advantageously, said fourth concavity R16 has opposite sense with respect to said third concavity R15. In this manner, said first fin third stretch 15 and said first fin fourth stretch 16 describe an "S"-shaped profile on a plane parallel to the braking surfaces 21, 22 of the disc 2 and which crosses said gap 6.

The combined provision of said first fin first stretch 13, said first fin second stretch 14, said first fin third stretch 15 and said first fin fourth stretch 16 allows said first fin 9 to describe a "double-S"-shaped profile on a plane parallel to the braking surfaces 21, 22 of the disc 2 and that crosses said gap 6.

According to an embodiment, said first fin 9 comprises a first fin second inflection stretch 29 interposed between said first fin third stretch 15 and said first fin second stretch 16.

According to a preferred embodiment, said first fin first stretch 13 is located radially internally with respect to said first fin second stretch 14. According to a preferred embodiment, said first fin third stretch 15 is located radially internally with respect to said first fin fourth stretch 16.

Preferably, said first fin third stretch 15 is located radially externally with respect to said first fin second stretch 14.

According to an embodiment, the sense of said first concavity R13 agrees with said third concavity R15 and the sense of said second concavity R14 agrees with said fourth concavity R16. According to an embodiment, said first fin 9 further comprises a first fin third inflection stretch 36 interposed between said first fin second stretch 14 and said first fin third stretch 15. Preferably, a substantially rectilinear first fin intermediate stretch 50 comprising said first fin third inflection stretch 36 is interposed between said first fin second stretch 14 and said first fin third stretch 15.

Said first fin second stretch 17 has a fifth concavity R17 which is kept in the same sense along the entire extension of the first fin second stretch 17 in said first longitudinal direction 12.

Said second fin 10 extends according to said first longitudinal direction 12 further forming a circumferentially arched second fin second stretch 18.

Said second fin second stretch 18 has a sixth concavity R18 which is kept in the same sense along the entire extension of the second fin second stretch 18 in said second longitudinal direction 12.

Advantageously, said sixth concavity R18 has opposite sense with respect to said fifth concavity R17. In this manner, said second fin first stretch 17 and said second fin second stretch 18 describe an "S"-shaped profile on a plane parallel to the braking surfaces 21, 22 of the disc 2 and which crosses said gap 6. In accordance with an embodiment, said second fin 10 comprises a second fin first inflection stretch 31 which is interposed between said second fin first stretch 17 and said second fin second stretch 18.

Said second fin 10 extends according to said second longitudinal direction 12 further forming a circumferentially arched second fin third stretch 19.

Said second fin third stretch 19 has a seventh concavity R19 which is kept in the same sense along the entire extension of the second fin third stretch 18 in said second longitudinal direction 12.

Said second fin 10 extends according to said second longitudinal direction 12 further forming a circumferentially arched second fin fourth stretch 20.

Said second fin fourth stretch 20 has an eighth concavity R20 which is kept in the same sense along the entire extension of the second fin fourth stretch 20 in said second longitudinal direction 12.

Further advantageously, said eighth concavity R20 has opposite sense with respect to said seventh concavity R19. In this manner, said second fin third stretch 19 and said second fin fourth stretch 20 describe an "S"-shaped profile on a plane parallel to the braking surfaces 21, 22 of the disc 2 and which crosses said gap 6. According to an embodiment, said second fin 10 comprises a second fin second inflection stretch 32 which is interposed between said second fin third stretch 19 and said second fin fourth stretch 20.

According to a preferred embodiment, said first fin first stretch 17 is located radially internally with respect to said second fin second stretch 18. According to a preferred embodiment, said second fin third stretch 19 is located radially internally with respect to said second fin fourth stretch 20. Preferably, said second fin third stretch 19 is located radially externally with respect to said second fin second stretch 18.

The combined provision of said second fin first stretch 17, said second fin second stretch 18, said second fin third stretch 19 and said second fin fourth stretch 20 allows said second fin 10 to describe a "double-S"-shaped profile on a plane parallel to the braking surfaces 21, 22 of the disc 2 and that crosses said gap 6.

According to an embodiment, the sense of said fifth concavity R17 agrees with said seventh concavity R19 and the sense of said sixth concavity R18 agrees with said eighth concavity R20. According to an embodiment, said second fin 10 further comprises a second fin third inflection stretch 37 which is interposed between said second fin second stretch 18 and said second fin third stretch 19. According to an embodiment, a second fin intermediate stretch 18 comprising said second fin third inflection stretch 19 is interposed between said second fin second stretch 51 and said second fin third stretch 37. According to an embodiment, said second fin intermediate stretch 51 has a second fin intermediate stretch concavity R51. According to an embodiment, said second fin intermediate stretch 51 is substantially rectilinear.

The provision of such connecting fins 9, 10 constituting said module M delimit at least a ventilation channel 33, which defines a longitudinal channel direction 60 substantially coinciding with the longitudinal development axis of said ventilation channel 33.

According to an embodiment, said ventilation channel 33 includes a radially inner mouth 34 facing the rotation axis A-A, and a radially outer mouth 35, radially opposite with respect to said radially inner mouth 34.

Preferably, said at least a ventilation channel 33 defines said module M together with said connecting fins 9, 10.

In working conditions, the disc 2 rotates in a sense of rotation V and the ventilation fluid flow enters into said at least a ventilation channel 33 passing through said radially inner mouth 34 and exits from said at least a ventilation channel 33 from said radially outer mouth 35.

In working conditions, the ventilation fluid flow crosses said at least one ventilation channel 33 along said longitudinal channel direction 60.

According to an embodiment, said at least a ventilation channel 33 is delimited transversely to the longitudinal channel direction 60 by said first fin 9 and by said second fin 10, and is delimited in axial direction X-X by said first plate 4 and by said second plate 5. According to an embodiment, said at least a ventilation channel 33 is delimited transversely to the longitudinal channel direction 60 by said first fin 9 and by said second fin 10, and is delimited in axial direction X-X by said first plate inner surface 27 and by said second plate inner surface 28.

According to an embodiment, said longitudinal channel direction 60 is non-parallel to the radial direction R-R.

According to an embodiment, said at least a ventilation channel 33 has a tortuous path in the longitudinal channel direction 60.

According to a preferred embodiment, said first fin 9 comprises a first fin body 43 and said second fin 10 comprises a second fin body 44.

According to an embodiment, the first fin body 43 comprises an axial connecting portion 45 which extends to axially connect said first plate 4 with said second plate 5, and a longitudinal tongue 46 which extends axially for a portion of the axial distance between said first plate 9 and said second plate 10 forming a tongue surface 47 axially facing said gap 6. In this manner, said longitudinal tongue 46 of said first fin 9 avoids forming a connection in axial direction X-X between said first plate and said second plate. Therefore, an axial inlet bottleneck which accelerates the flow entering into said at least a ventilation channel 33 is formed.

According to an embodiment, said radially inner mouth 34 is delimited by said first fin longitudinal tongue 46, by said second fin 10, by said first plate 4 and by said second plate 5.

According to an embodiment, the first fin body 43 further comprises a joining foot 48 to form a curved joining and connecting surface between the inner surface 27, 28 of at least either said first plate 4 or said second plate 5 and the fin part facing the ventilation channel 33.

According to an embodiment, said connecting portion 45 of said first fin 9 seamlessly extends for a portion of said first longitudinal line 11 and said longitudinal tongue extends from said connecting portion 45 of the first fin 9 towards said radially inner edge 8 of the braking band 1, whereby defining at least partially said radially inner mouth 34.

According to an embodiment, said longitudinal tongue 46 of said first fin 9 defines a baffle wall 49 radially internally facing the ventilation fluid flow on the connecting portion 45 of the first fin 9. According to an embodiment, said baffle part 49 has a baffle wall concavity R49 always turned in the same sense and having a variable curvature radius.

According to an embodiment, the body of the second fin 44 comprises an axial connecting portion 45 and a joining foot 48, whereby avoiding to comprise said longitudinal tongue 46.

By virtue of the provision of said longitudinal tongue 46, it is possible to provide an inlet window having increased circumferential access section to the at least a ventilation channel 33.@@

According to an embodiment, said first fin 9 and said second fin 10 each seamlessly extend both in axial direction X-X and in radial direction R-R. In this manner, said at least a ventilation channel 33 is free from side branches or openings interposed between said radially inner mouth 34 and said radially outer mouth 35.

By virtue of the provision of said pitch of the modules, it is possible to delimit ventilation channels 33 with stretches which radially follow each other having variable cross-section, whereby forming widened portions and bottlenecks, even if said connecting fins 9, 10 have substantially mutually identical profile.

According to an embodiment, said at least a ventilation channel 33 extends along the longitudinal channel direction 60 from said radially inner mouth 34 to said radially outer mouth 35, whereby forming a first widened stretch 40, a bottleneck 41 and a second widened stretch 42. Preferably, said bottleneck 41 is interposed between said first widened stretch 40 and said second widened stretch 42.

The provision of such a ventilation channel 33 determines a Venturi effect on the ventilation fluid flow which crosses the ventilation channel 33 from said radially inner mouth 34 to said radially outer mouth 34.

According to an embodiment, said bottleneck 41 is located radially externally with respect to said first widened stretch 40 and said second widened stretch 42 is located radially externally with respect to said bottleneck 41.

According to an embodiment, said at least a ventilation channel 33 comprises a first widened portion 40, transversely delimited by said first fin first inflection 24 and by said second fin first stretch 17.

According to an embodiment, said ventilation channel 33 comprises a first bottleneck 41, transversely delimited by said first fin intermediate stretch 50, preferably by first fin third inflection portion 36, and by said second fin second stretch 18. According to an embodiment, said first fin intermediate stretch 50 has a first fin intermediate stretch concavity R50. According to an embodiment, said first fin intermediate stretch 50 is substantially rectilinear.

According to an embodiment, said one ventilation channel 33 comprises a second widened portion 42, transversely delimited by said first fin second inflection portion 29 and by said second fin third stretch 19.

The provision of such a ventilation channel 33 constituting said module M allows to locally either accelerate or slow the ventilation fluid flow speed, whereby keeping constant the flow rate which is as a function of the rotation speed of the disc 2.

By virtue of the provision of such a ventilation channel 33 constituting said module M and comprising widened portions 40, and at least a bottleneck 41, sudden and local changes of advancement speed in the ventilation channel 33 of the ventilation fluid flow are forced, which result in a given degree of turbulence of the flow.

According to an embodiment, said first fin 9 comprises a first fin radially inner stretch 38 which extends axially internally with respect to said first fin first circumferentially arched stretch 15. Preferably, said first fin radially inner stretch 38 has a concavity of opposite sense with respect to said first concavity R13 of said first fin first stretch 13. According to an embodiment, said second fin radially inner stretch 38 is substantially rectilinear. Preferably, said longitudinal tongue extends radially internally from said first fin radially inner stretch 38.

According to an embodiment, said first fin 10 comprises a second fin radially inner stretch 39 which extends axially internally with respect to said second fin first circumferentially arched stretch 17. Preferably, said second fin radially inner stretch 39 has an opposite sense concavity with respect to said fifth concavity R17 of said second fin first stretch 17. According to an embodiment, said second fin radially inner stretch 39 is substantially rectilinear.

According to an embodiment, said first fin radially inner stretch 38 and said second fin radially inner stretch 39 diverge in radially outer direction RO. In this manner, said at least a ventilation channel 33 comprises a radially inner channel portion 54, transversally delimited by said first fin radially inner stretch 38 and said second fin radially inner stretch 39, whereby forming a fluidic diffuser. In this manner, the ventilation fluid flow speed decreases along said radially inner channel stretch 54, whereby maintaining a constant flow rate. Preferably, said radially inner mouth 34 opens into said radially inner channel stretch 54. Preferably, said radially inner channel stretch 54 opens into said first widened portion 40.

According to an embodiment, said first fin 9 comprises a first fin radially outer stretch 52 which extends radially externally with respect to said first fin fourth circumferentially arched stretch 16. Preferably, said first fin radially outer stretch 52 has a first fin radially outer stretch concavity R52 of opposite sense with respect to said fourth concavity R16 of said first fin fourth stretch 16. According to an embodiment, said first fin radially outer stretch 52 is substantially rectilinear.

According to an embodiment, said second fin 10 comprises a second fin radially outer stretch 53 which extends radially internally with respect to said second fin fourth circumstantially arched stretch 20. Preferably, said second fin radially outer stretch 53 has a second fin radially outer stretch concavity R53 of opposite sense with respect to said eighth concavity R20 of said second fin fourth stretch 20. According to an embodiment, said second fin radially outer stretch 53 is substantially rectilinear.

According to an embodiment, said first fin radially outer portion 52 and said second fin radially outer portion 53 delimit a radially outer channel stretch 55 which leads into said radially outer mouth 35. Preferably, said first fin radially outer portion 52 and said second fin radially outer portion 53 delimit an outlet bottleneck at said radially outer mouth 35 so as to accelerate the flow exiting from the ventilation channel 33, whereby promoting the extraction of heat from the braking band 1. For example, both said first fin 9 and said second fin 10 comprise a radially outer end portion 59 of increased circumferential extension so as to locally reduce the circumferential section of the radially outer mouth 35 of the ventilation channel 33.

According to an embodiment, the crosswise extension of said radially outer channel stretch 55 is greater than said radially inner channel stretch 54. In this manner, the ventilation fluid stream which crosses the at least a ventilation channel 33 from said radially inner mouth 34 to said radially outer mouth 35 is promoted.

According to an embodiment, said first fin 9 and said second fin 10 both extend to the same radially outer circumferential level 61. In other words, said first fin radially outer stretch 55 and said second fin radially outer stretch 56 both extend so as to touch the same radially outer circumferential level 61. Preferably, said radially outer circumferential level 61 is located radially internally with respect to said radially outer edge 7 of the braking band 1.

According to an embodiment, said connecting portion 45 of said first fin 9 extends in radially inner direction RI to touch a radially inner first circumferential level 62 and said connecting portion 45 of said second fin 10 extends in radial inner direction RI to touch a radially inner second circumferential level 63, positioned radially internally with respect to said radially inner first circumferential level 61.

According to an embodiment, said first fin radially inner stretch and said second fin radially inner stretch are non-parallel in radially direction R-R. Preferably, said radially inner second fin stretch 39 comprises a curved joining wall 57 facing the rotation axis A-A of the disc 2 and a radially inner recess wall 56 facing the rotation axis A-A of the disc 2, wherein said radially inner recess part 56 is substantially parallel to the circumferential direction C-C.

According to an embodiment, the edge of the curved joining wall 57 describes a curved profile on a plane parallel to the braking surfaces of the disc 21, 22 and passing through said gap 6 having a curved joining wall concavity R57 which is kept in the same sense for the whole edge of the curved connecting wall 57. Preferably, said curved joining part 57 is adjacent to said radially inner recess wall 56. According to an embodiment, said curved joining part 57 and said radially inner recess wall 56 meet in a joining section 58. According to an embodiment, said curved joining wall 57 form, in said joining section, a predetermined angle α with the radially inner recess face 57. Preferably, said predetermined angle α is substantially equal to the angle formed between the longitudinal extension of the module M comprising said first fin 9 and said second fin 10 and the radial direction R-R. In other words, said predetermined angle α can be related to the pitch of the modules M. Preferably, said predetermined angle α is between 15° and 60°, and preferably comprised between 20° and 45°.

According to a general embodiment, a disc 2 for disc brake 3 is provided comprising a braking band 1, according to any one of the embodiments described previously, and a disc bell 25.

According to an embodiment, said disc 2 further comprises a disc bell 25, intended to be connected to a wheel hub of an associable vehicle. Preferably, said disc bell 25 comprises a connection portion to the hub 26, adapted to connect either directly or indirectly to the wheel hub of an associable vehicle. Preferably, said braking band 1 and said disc bell 25 are mutually coaxial.

According to an embodiment, at least either said first plate 4 and said second plate 5, preferably said second plate 5, comprises a plurality of feeding teeth 23 which protrude in radially inner direction RE from the radially inner edge 8 of the said second plate 5, said feeding teeth 23 forming the connection to the disc bell 25 to transfer in circumferential direction C-C the braking action of the braking band 1 to the disc bell 25.

According to a general embodiment, a disc brake 3 comprises at least a braking band 1 according to any one of the embodiments described above, at least a disc bell 25 and at least a brake caliper 30 positioned straddling the outer peripheral margin of said disc 2.

Figures 9, 10:
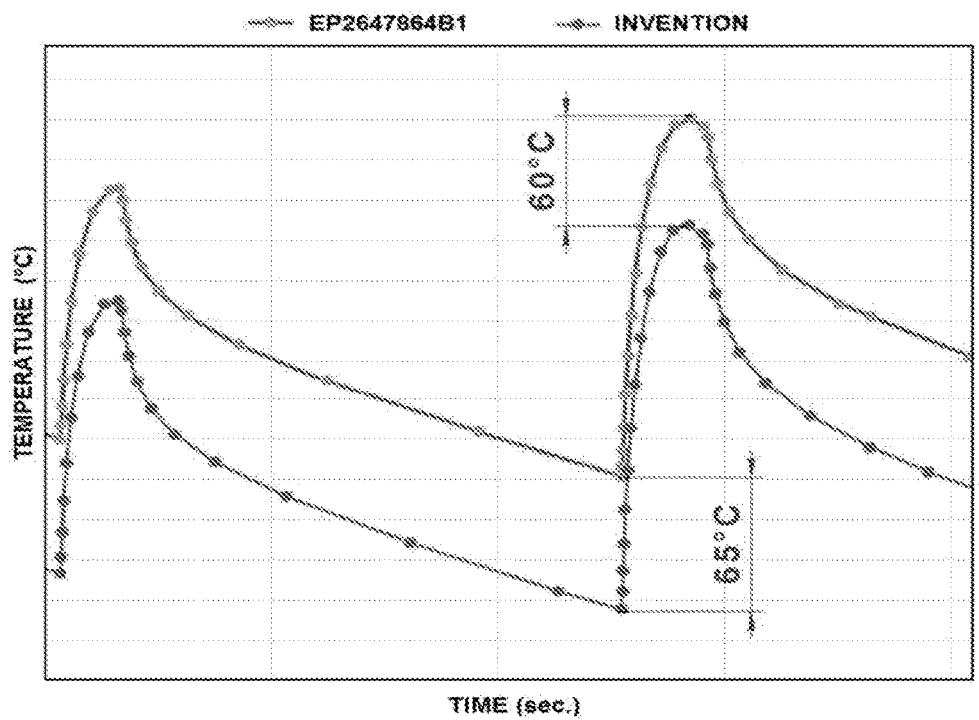
FIG. 9 shows a summary table of a comparative analysis performed by the inventors.
FIG. 10 is a chart showing the trend over time of the temperature of a braking band resulting from a comparative analysis performed by the inventors.
Figure 11:
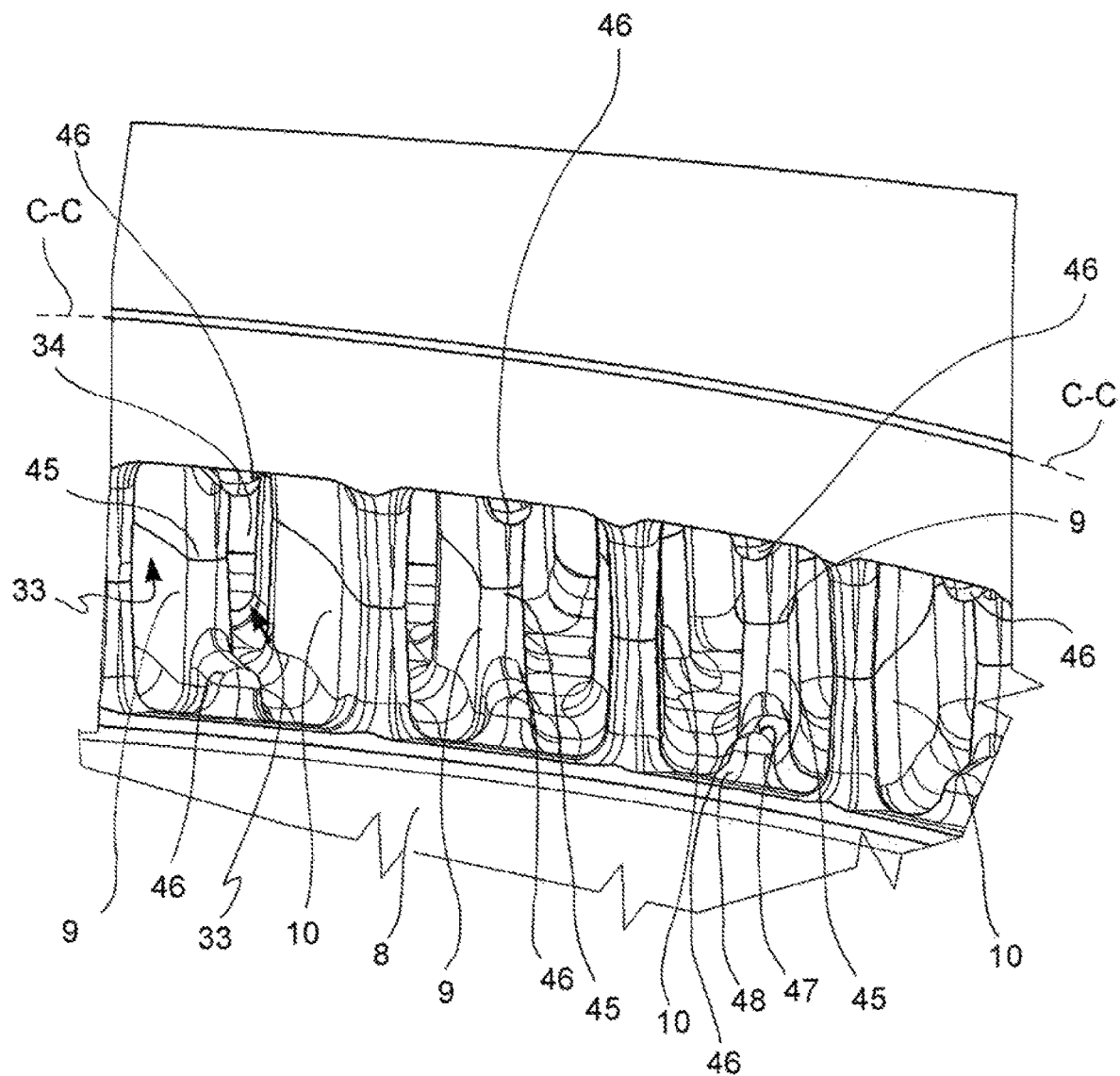
FIG. 11 is a perspective view showing a braking band, according to an embodiment, as seen from rotation axis of the disc.

By virtue of the features described above, provided either separately or in combination, it is possible to provide a solution to the aforesaid often conflicting needs and to obtain the aforesaid advantages, in particular:

- it suggests a modular solution of group of connecting fins and ventilation channels which is particularly adapted to optimize the heat extraction performance from the disc in operating conditions;
- it provides a ventilated braking band with improved ability of extracting heat from the disc with respect to known solutions;
- it allows to obtain optimal ventilation fluid flow in conditions of turbulence in the ventilation channel 33;
- it allows to obtain a better heat exchange surface efficiency between the braking band and the ventilation fluid;
- from a comparative analysis performed by the inventors and documented in FIGS. 9-10, comparative analysis performed between a disc comprising the braking band according to the invention and a disc according to the prior document EP-2647864-B1, it appears that the provision of such a braking band 1 allows to obtain a 25% increase of the ventilation fluid flow rate MF inside the braking band 1, as well as a 20% increase of the heat exchange HT by convection between the braking band and the ventilation fluid; concurrently, it allows to obtain an 8% increase of the heat exchange coefficient w/m²K; furthermore, as shown in the chart in FIG. 9, the braking band according to the invention allows to obtain a decrease of about 60° C. of the maximum working temperature, as well as a decrease of about 65° C. of the minimum working temperature of a disc provided with the braking band.

Those skilled in the art may make many changes and adaptations to the embodiments described above or may replace elements with others which are functionally equivalent in order to meet contingent needs without however departing from the scope of the appended claims.

LIST OF REFERENCE SYMBOLS

1 braking band
2 disc
3 disc brake
4 first plate
5 second plate
6 gap
7 radially outer band edge
8 radially inner band edge
9 first fin
10 second fin
11 first longitudinal line
12 second longitudinal line
13 first fin first circumferentially arched stretch, or first fin first stretch
14 first fin second circumferentially arched stretch, or first fin second stretch
15 first fin third circumferentially arched stretch, or first fin third stretch
16 first fin fourth circumferentially arched stretch, or first fin fourth stretch
17 second fin first circumferentially arched stretch, or second fin first stretch
18 second fin second circumferentially arched stretch, or second fin second stretch
19 second fin third circumferentially arched stretch, or second fin third stretch
20 second fin fourth circumferentially arched stretch, or second fin fourth stretch
21 first braking surface
22 second braking surface
23 feeding teeth
24 first fin first inflection portion
25 disc bell
26 connecting portion to the hub
27 first plate inner surface, or first inner surface
28 second plate inner surface, or second inner surface
29 first fin second inflection portion
30 brake caliper
31 second fin first inflection portion
32 second fin second inflection portion
33 ventilation channel
34 radially inner mouth
35 radially outer mouth
36 first fin third inflection portion
37 second fin third inflection portion
38 first fin radially inner stretch
39 second fin radially inner stretch
40 first enlarged channel stretch
41 ventilation channel first bottleneck
42 second enlarged channel stretch
43 first fin body
44 second fin body
45 fin connecting portion
46 first fin longitudinal tongue
47 tongue surface
48 fin joining foot
49 first fin baffle wall
50 first fin intermediate stretch
51 second fin intermediate stretch
52 first fin radially outer stretch
53 second fin radially outer stretch
54 channel radially inner stretch
55 channel radially outer stretch
56 second fin radially inner recess wall
57 second fin first joining wall
58 joining section
59 radially outer peripheral portion
60 Longitudinal channel direction
61 Radially outer circumferential level
62 Radially inner first circumferential level
63 Radially inner second circumferential level
V Sense of rotation of disc
A-A Disc rotation axis
X-X Axial direction
R-R Radial direction C-C Circumferential direction
RI Inner radial direction
RO Outer radial direction
R13 First concavity
R14 Second concavity
R15 Third concavity
R16 Fourth concavity
R17 Fifth concavity
R18 Sixth concavity
R19 Seventh concavity
R20 Eighth concavity
R49 Concavity of the first fin baffle wall
R50 First fin intermediate stretch concavity
R51 Second fin intermediate stretch concavity
R52 First fin radially outer stretch concavity
R53 Second fin radially outer stretch concavity
R57 Second fin joining wall concavity

The invention claimed is:

1. A braking band of a disc for disc brake, said disc defining a rotation axis (A-A), which defines an axial direction (X-X) either coinciding with or parallel to said rotation axis (A-A) of the disc, a radial direction (R-R) substantially orthogonal to the axial direction (X-X), and a circumferential (C-C) or tangential (C-C) direction, substantially orthogonal to the axial direction (X-X) and to the radial direction (R-R), said braking band comprising a first plate and a second plate, arranged mutually facing each other so as to form a gap, wherein at least either said first plate or said second plate comprises a radially inner edge, facing said rotation axis (A-A) of the disc, and a radially outer edge substantially coaxial with said radially inner edge and facing opposite with respect to said rotation axis (A-A) of the disc, said braking band further comprises a group of connecting fins which connects said first plate and said second plate, defining a module (M) repeated according to said circumferential direction (C-C), said group of connecting fins comprises a first fin which connects said first plate and said second plate, and a second fin which connects said first plate and said second plate, wherein said first fin extends along a first longitudinal direction between said radially inner edge and said radially outer edge forming:

a circumferentially arched first length of said first fin, said circumferentially arched first length of said first fin having a first concavity (R13) which extends along the entire extension of the circumferentially arched first length of said first fin in said first longitudinal direction;

a circumferentially arched second length of said first fin, said circumferentially arched second length of said first fin having a second concavity (R14) which extends along the entire extension of the circumferentially arched second length of said first fin in said first longitudinal direction, said second concavity (R14) having opposite direction with respect to said first concavity (R13);

a circumferentially arched third length of said first fin, said circumferentially arched third length of said first fin having a third concavity (R15) which extends along the entire extension of the third length of said first fin in said first longitudinal direction;

a circumferentially arched fourth length of said first fin, said circumferentially arched fourth length of said first fin having a fourth concavity (R16) which extends along the entire extension of the third length of said first fin in said first longitudinal direction, said fourth concavity (R16) having opposite direction with respect to the said third concavity (R15);

and wherein said second fin extends along a second longitudinal direction between said radially inner edge and said radially outer edge forming:

a circumferentially arched first length of said second fin, said circumferentially arched first length of said second fin having a fifth concavity (R17) which extends along the entire extension of the first length of said second fin in said second longitudinal direction;

a circumferentially arched second length of said second fin, said circumferentially arched second length of said second fin having a sixth concavity (R18) which extends along the entire extension of the second length of said second fin in said second longitudinal direction, said sixth concavity (R18) having opposite direction with respect to the said fifth concavity (R17);

a circumferentially arched third length of said second fin, said circumferentially arched third length of said second fin having a seventh concavity (R19) which extends along the entire extension of the third length of said second fin in said second longitudinal direction;

a circumferentially arched fourth length of said second fin, said circumferentially arched fourth length of said second fin having an eighth concavity (R20) which extends along the entire extension of the fourth length of said second fin in said second longitudinal direction; said eighth concavity (R20) having opposite direction with respect to said seventh concavity (R19); and wherein said first fin has a length that is shorter than the length of said second fin.

2. The braking band of claim 1, wherein said group of connecting fins constituting said module (M) delimits at least one ventilation channel, which defines a longitudinal channel direction substantially coinciding with a longitudinal development axis of said at least one ventilation channel.

3. The braking band of claim 2, wherein said at least one ventilation channel extends along the longitudinal channel direction between a radially inner mouth and a radially outer mouth forming a first widened length, a bottleneck and a second widened length.

4. The braking band of claim 3, wherein said bottleneck is interposed between said first widened length and said second widened length.

5. The braking band of claim 3, wherein a radially outer portion of said first fin and a radially outer portion of said second fin delimit a radially outer channel length which leads into said radially outer mouth.

6. The braking band of claim 3, wherein a radially outer portion of said first fin and a radially outer portion of said second fin delimit an outlet bottleneck at said radially outer mouth so as to accelerate a flow exiting from the ventilation channel.

7. The braking band of claim 2, wherein said longitudinal channel direction is not parallel to the radial direction (R-R).

8. The braking band of claim 1, wherein said first fin comprises a radially inner length of said first fin which extends radially internally with respect to said circumferentially arched first stretch of said first fin, and said second fin comprises a radially inner length of said second fin which extends radially internally with respect to said circumferentially arched first stretch of said second fin.

9. The braking band of claim 8, wherein said radially inner length of said first fin and said radially inner length of said second fin diverge in radially outer direction (RO).

10. The braking band of claim 8, wherein
said first fin and said second fin both extend to a same radially outer circumferential level; and/or wherein
said radially inner length of said second fin comprises a curved connecting wall facing the rotation axis (A-A) of the disc and a radially inner recess wall facing the rotation axis (A-A) of the disc, wherein said radially inner recess part is substantially parallel to the circumferential direction (C-C).

11. The braking band of claim 1, wherein the direction of said first concavity (R13) is complementary with the direction of said third concavity (R15) and the direction of said second concavity (R14) is complementary with the direction of said fourth concavity (R16).

12. The braking band of claim 1, wherein the direction of said fifth concavity (R17) is complementary with the direction of said seventh concavity (R19) and the direction of said sixth concavity (R18) is complementary with the direction of said eighth concavity (R20).

13. The braking band of claim 1, wherein the body of said first fin comprises an axial connecting portion which extends to axially connect said first plate with said second plate, and a longitudinal tongue which extends axially along a portion of an axial distance between said first plate and said second plate forming a tongue surface axially facing said gap, preventing said longitudinal tongue from forming a connection in axial direction (X-X) between said first plate and said second plate.

14. A disc for disc brake, said disc defining a rotation axis (A-A), which defines an axial direction (X-X) either coinciding with or parallel to said rotation axis (A-A) of the disc, a radial direction (R-R) substantially orthogonal to the axial direction (X-X), and a circumferential (C-C) or tangential (C-C) direction, substantially orthogonal to the axial direction (X-X) and to the radial direction (R-R), said disc comprising a disc bell and a braking band, said braking band comprising a first plate and a second plate, arranged mutually facing each other so as to form a gap, wherein
at least either said first plate or said second plate comprises a radially inner edge, facing said rotation axis (A-A) of the disc, and a radially outer edge substantially coaxial with said radially inner edge and facing opposite with respect to said rotation axis (A-A) of the disc,
said braking band further comprises a group of connecting fins which connects said first plate and said second plate, defining a module (M) repeated according to said circumferential direction (C-C),
said group of connecting fins comprises a first fin which connects said first plate and said second plate, and a second fin which connects said first plate and said second plate, wherein
said first fin extends along a first longitudinal direction between said radially inner edge and said radially outer edge forming:
a circumferentially arched first length of said first fin, said circumferentially arched first length of said first fin having a first concavity (R13) which extends along the entire extension of the circumferentially arched first length of said first fin in said first longitudinal direction;
a circumferentially arched second length of said first fin, said circumferentially arched second length of said first fin having a second concavity (R14) which extends along the entire extension of the circumferentially arched second stretch of said first fin in said first longitudinal direction, said second concavity (R14) having opposite direction with respect to said first concavity (R13);
a circumferentially arched third length of said first fin, said circumferentially arched third length of said first fin having a third concavity (R15) which extends along the entire extension of the third length of said first fin in said first longitudinal direction;
a circumferentially arched fourth length of said first fin, said circumferentially arched fourth length of said first fin having a fourth concavity (R16) which extends along the entire extension of the third length of said first fin in said first longitudinal direction, said fourth concavity (R16) having opposite direction with respect to the said third concavity (R15);
and wherein said second fin extends along a second longitudinal direction between said radially inner edge and said radially outer edge forming:
a circumferentially arched first length of said second fin, said circumferentially arched first length of said second fin having a fifth concavity (R17) which extends along the entire extension of the first length of said second fin in said second longitudinal direction;
a circumferentially arched second length of said second fin, said circumferentially arched second length of said second fin having a sixth concavity (R18) which extends along the entire extension of the second length of said second fin in said second longitudinal direction, said sixth concavity (R18) having opposite direction with respect to the said fifth concavity (R17);
a circumferentially arched third length of said second fin, said circumferentially arched third length of said second fin having a seventh concavity (R19) which extends along the entire extension of the third length of said second fin in said second longitudinal direction;
a circumferentially arched fourth length of said second fin, said circumferentially arched fourth length of said second fin having an eighth concavity (R20) which extends along the entire extension of the fourth length of said second fin in said second longitudinal direction; said eighth concavity (R20) having opposite direction with respect to said seventh concavity (R19); and wherein
said first fin has a length that is shorter than the length of said second fin.

15. A disc brake comprising a disc according to claim 14 and at least one brake caliper.

* * * * *